United States Patent
Cunningham et al.

(10) Patent No.: US 6,732,585 B1
(45) Date of Patent: May 11, 2004

(54) WHEEL BALANCER ACCESSORY STORAGE DEVICE

(75) Inventors: Charles L. Cunningham, Nashville, TN (US); D. Randall Greer, Murfreesboro, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 0 days.

(21) Appl. No.: 10/251,632

(22) Filed: Sep. 20, 2002

(51) Int. Cl.[7] ............................................... G01M 1/00
(52) U.S. Cl. ....................... 73/487; 73/462; 211/163; D10/82
(58) Field of Search ..................... 73/487, 66, 460, 73/462; 211/163; D10/82

(56) References Cited

U.S. PATENT DOCUMENTS

| | | | | |
|---|---|---|---|---|
| 3,017,774 A | * | 1/1962 | Thompson | 73/487 |
| 3,875,804 A | * | 4/1975 | Vance | 763/457 |
| RE28,601 E | * | 11/1975 | Hofmann | 73/468 |
| 3,966,052 A | * | 6/1976 | Knaus | 211/70.6 |
| 4,170,307 A | * | 10/1979 | Maeder | 211/70.6 |
| 4,341,119 A | * | 7/1982 | Jackson et al. | 73/462 |
| 4,352,291 A | * | 10/1982 | Curchod et al. | 73/462 |
| D315,524 S | * | 3/1991 | Cunningham et al. | D10/82 |
| 5,311,777 A | * | 5/1994 | Cunningham et al. | 73/462 |
| 5,969,247 A | * | 10/1999 | Carter et al. | 73/462 |

OTHER PUBLICATIONS

Brochure entitled "Coats The Best Wheel Balancer For Every Shop," Hennessy Industries, Inc., dated Dec. 1997.
Brochure entitled "DSP 9000 Featuring DSP Balancing," Hunter Engineering Company, dated Mar. 2000.
Brochure entitled "DSP 9500 Featuring DSP Balancing," Hunter Engineering Company, dated Sep. 1999.

* cited by examiner

Primary Examiner—Hezron Williams
Assistant Examiner—John C Hanley
(74) Attorney, Agent, or Firm—Nelson Mullins Riley & Scarborough

(57) ABSTRACT

An apparatus for balancing wheels includes a chassis, a driven shaft extending from the chassis for rotating the wheel, a wheel mounting accessory operably mounted on the driven shaft for use in mounting the wheel, and an accessory storage device rotatably mounted on the chassis for storing the accessory when not in use.

24 Claims, 8 Drawing Sheets

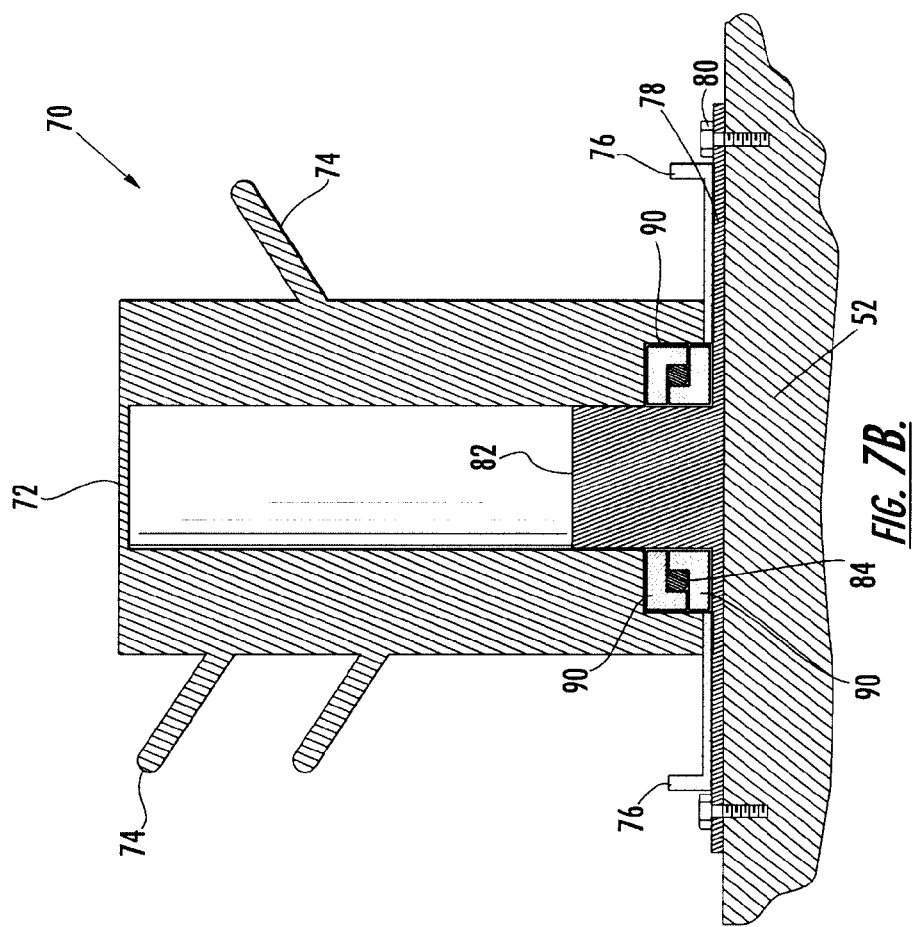
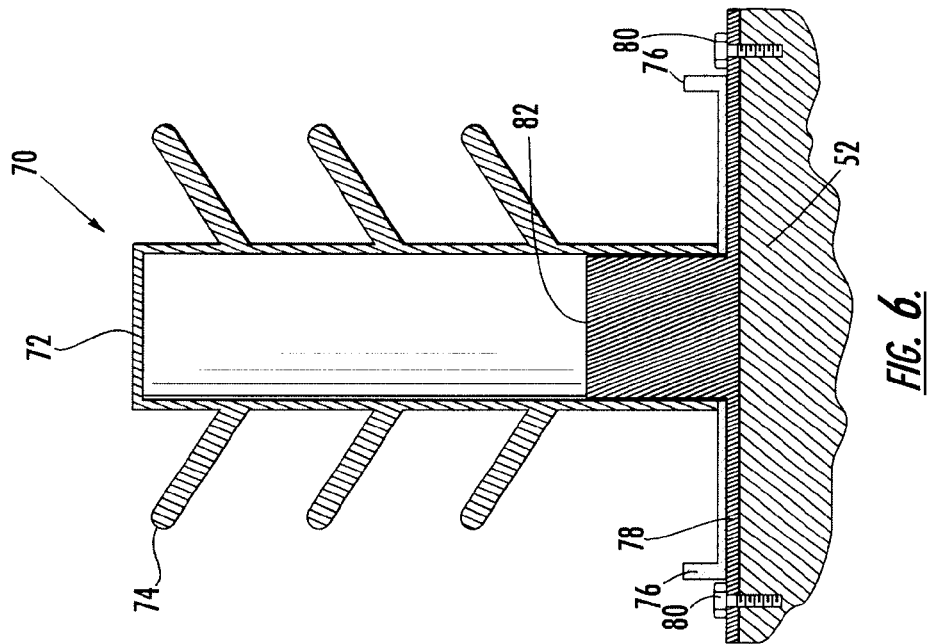
FIG. 7B.
FIG. 6.

WHEEL BALANCER ACCESSORY STORAGE DEVICE

BACKGROUND OF THE INVENTION

The present invention relates to the art of wheel balancers. Specifically, the present invention discloses a wheel balancer having a novel accessory storage device.

It is well known in the art that a balanced vehicle wheel is desirable for a variety of reasons. A modern wheel balancer can statically and dynamically balance a vehicle wheel to within 0.05 ounces at the rim flange. U.S. Pat. 5,311,777 describes a typical wheel balancer and is incorporated here by reference.

The wheel balancer generally includes a chassis which houses a drive motor, imbalance sensors, and various electronics. A driven shaft connects to the motor and extends from the chassis. A vehicle wheel mounts on the driven shaft for rotation during balancing operations. Often a pivotal wheel cover will be provided to shield the operator from the rotating wheel. A control panel typically mounts on the top of the chassis and provides a user interface between the operator and the balancer.

The generally accepted method for balancing a vehicle wheel is to remove the wheel from the vehicle and mount the wheel on the driven shaft of the balancer. Specially sized adapters fit in the hub opening of the wheel and slide over the driven shaft to locate the wheel thereon. The operator then lowers the wheel cover over the mounted wheel, and the motor rotates the driven shaft and wheel. Based on the imbalanced condition of the wheel, the imbalance sensors and electronics calculate the amount and location of balancing weights to be added. The operator then attaches one or more weights at the appropriate position on the wheel rim and re-mounts the balanced wheel on the vehicle.

In recent years, wheel styling has become a growing concern among automobile and after-market wheel manufacturers. As a result, wheel styles have many different diameters, rim sizes, and hub openings. To accommodate these various wheel styles, a variety of wheel mounting accessories, such as adapters, cones, springs, and spacers, are required for mounting the various wheel styles on the driven shaft. In addition, it is preferable to store the wheel mounting accessories directly on the wheel balancer in close proximity to the driven shaft to allow for quick retrieval and changing of the accessories during the balancing operation.

SUMMARY OF THE INVENTION

In one aspect, the present invention provides an improved wheel balancer having a chassis, a driven shaft extending from the chassis for rotating the wheel, an accessory operably mounted on the driven shaft for use in mounting the wheel on the shaft, and a storage device rotatably mounted on the chassis for storing the accessory when not in use. The rotatable storage device may include a plurality of pegs for holding corresponding accessories. Preferably, the storage device comprises a post from which the plurality of pegs radially extend.

In another aspect, the invention provides an improved wheel balancer having a chassis, a driven shaft extending from the chassis for rotating the wheel, a wheel mounting accessory operably mounted on the driven shaft for use in mounting the wheel, and a storage device rotatably mounted on the chassis. The storage device includes a post and a retainer for holding the wheel mounting accessory when not in use. Preferably, the retainer comprises a plurality of pegs extending radially from the post. The storage device may further include a tray attached to the post and extending radially from the post.

In a still further aspect, the invention provides an improved wheel balancer having a chassis, a driven shaft extending from the chassis for rotating the wheel, a wheel mounting accessory operably mounted on the driven shaft for use in mounting the wheel, and a storage device rotatably mounted on the chassis. The storage device includes a post and a plurality of pegs extending radially from the post for holding the wheel mounting accessory when not in use. The storage device may further include a tray attached to the post and extending radially from the post.

Those of ordinary skill in the art will better appreciate the features and aspects of presently preferred embodiments and others upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 6 is an enlarged cross-sectional view of the accessory storage device shown in FIG. 5 taken along line 6—6;

FIGS. 7A and 7B are cross-sectional views of alternate embodiments of the accessory storage device;

DETAILED DESCRIPTION OF PREFERRED EMBODIMENTS

Reference will now be made in detail to presently preferred embodiments of the invention, examples of which are illustrated in the accompanying drawings. Each example is provided by way of explanation of the invention, not limitation of the invention. In fact, it will be apparent to those skilled in the art that modifications, variations, and equivalent realizations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
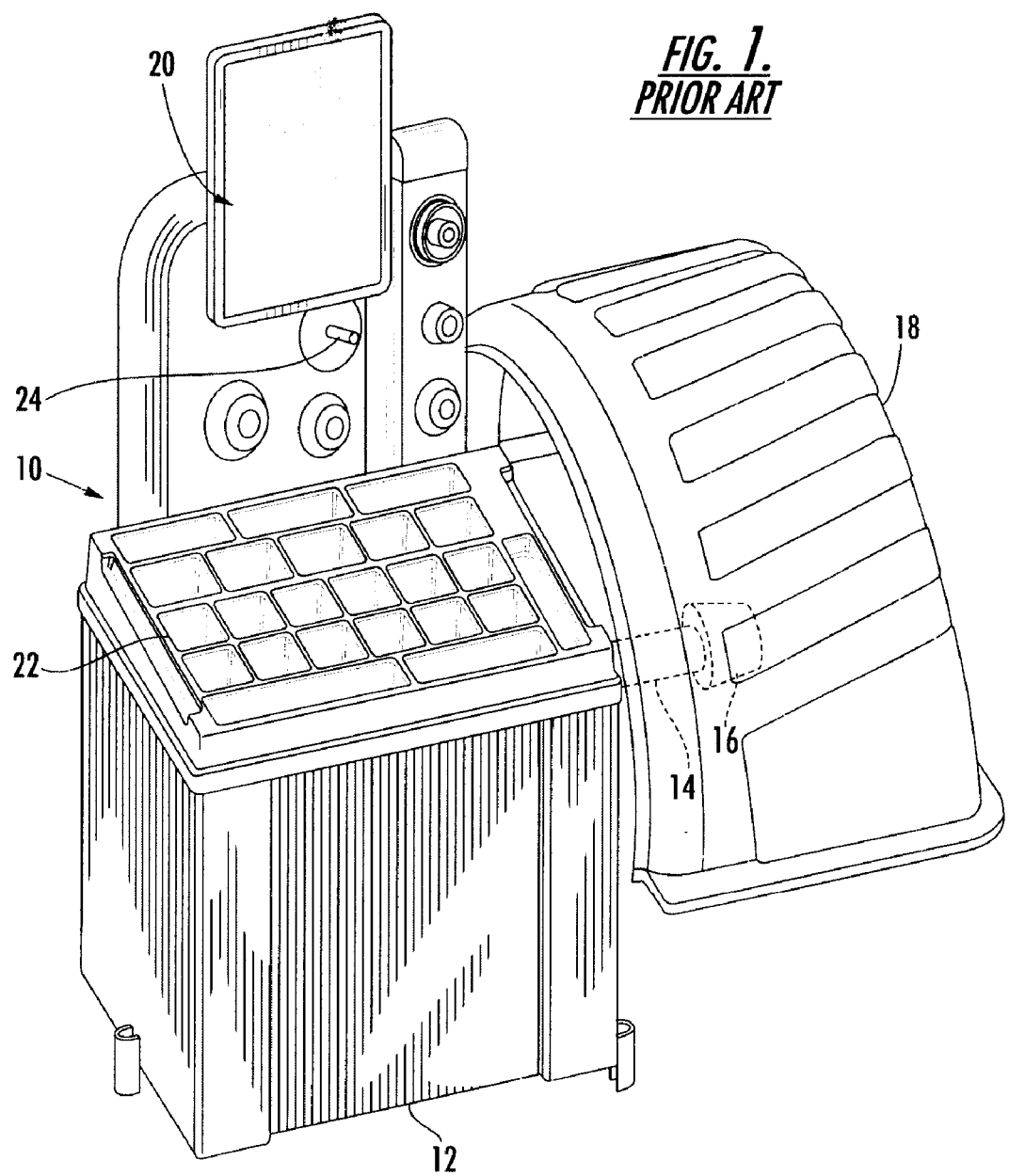
FIGS. 1 and 2 are perspective views of wheel balancers known in the art.
Figure 2:
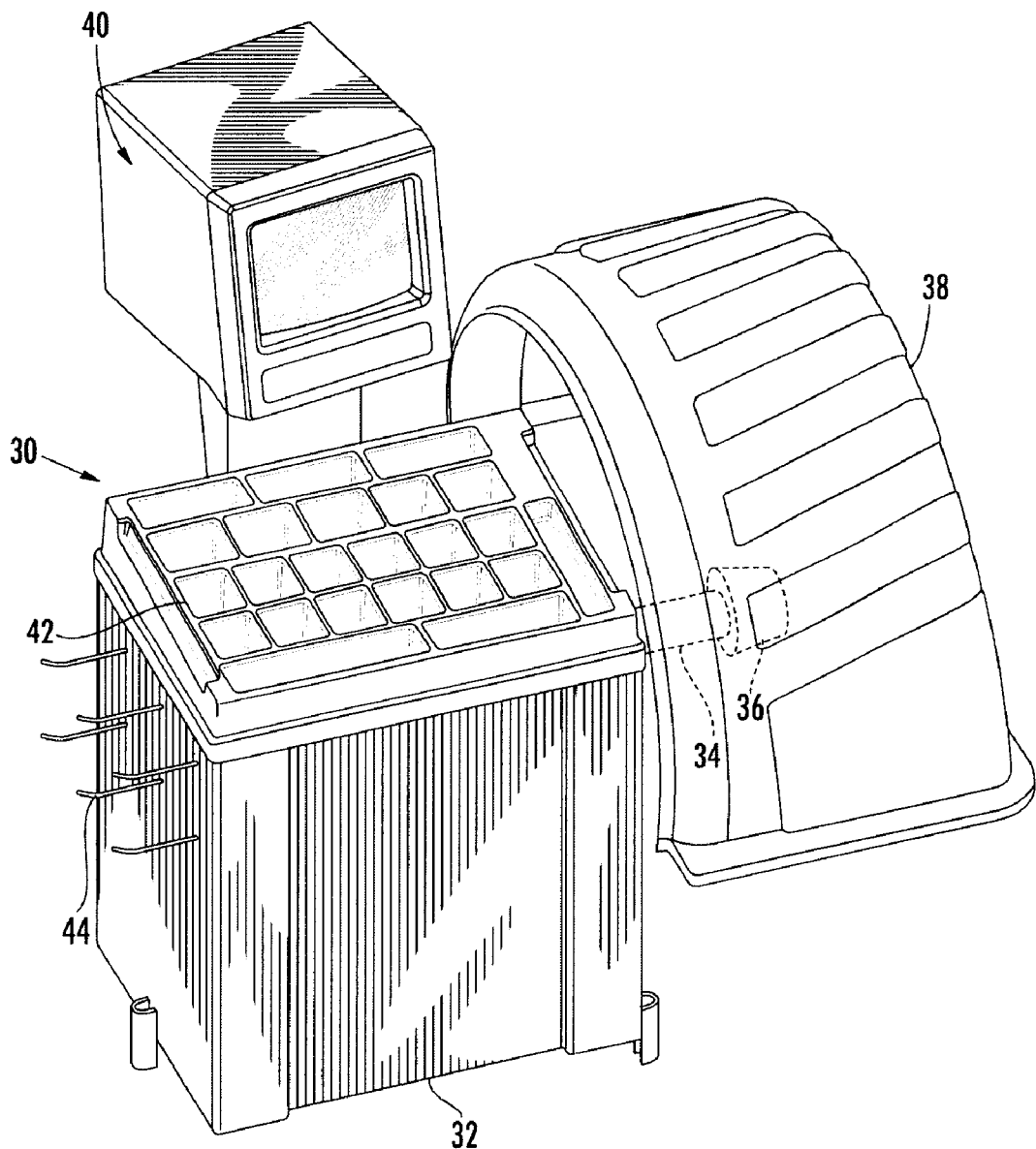

FIGS. 1 and 2 illustrate two different wheel balancers that are known in the art. Referring to FIG. 1, the balancer 10 includes a chassis 12, a driven shaft 14, various accessories such as an adapter 16, a wheel cover 18, a control panel 20, and a storage tray 22. As illustrated, driven shaft 14 extends from chassis 12, and adapter 16 slides over driven shaft 14 for mounting a wheel. Wheel cover 18 is pivotally connected to chassis 12 in such a manner that it can be lowered over the wheel before the balancing operation has commenced. Control panel 20 mounts on the top of chassis 12, and storage tray 22 provides a convenient location for balancing weights or other objects.

As shown in FIG. 1, several hooks 24 project from the location near control panel 20. It will be appreciated that the available surface area in this location limits the number of hooks 24, and thus the number of accessories that can be stored.

Referring now to FIG. 2, the balancer 30 again includes a chassis 32, a driven shaft 34, an adapter 36, a wheel cover 38, a control panel 40, and a storage tray 42. Six hooks 44 project from the side of chassis 32. Although more hooks are available at this location than for the balancer illustrated in FIG. 1, they are farther from driven shaft 34 and not as readily accessible during operations.

Figure 3:
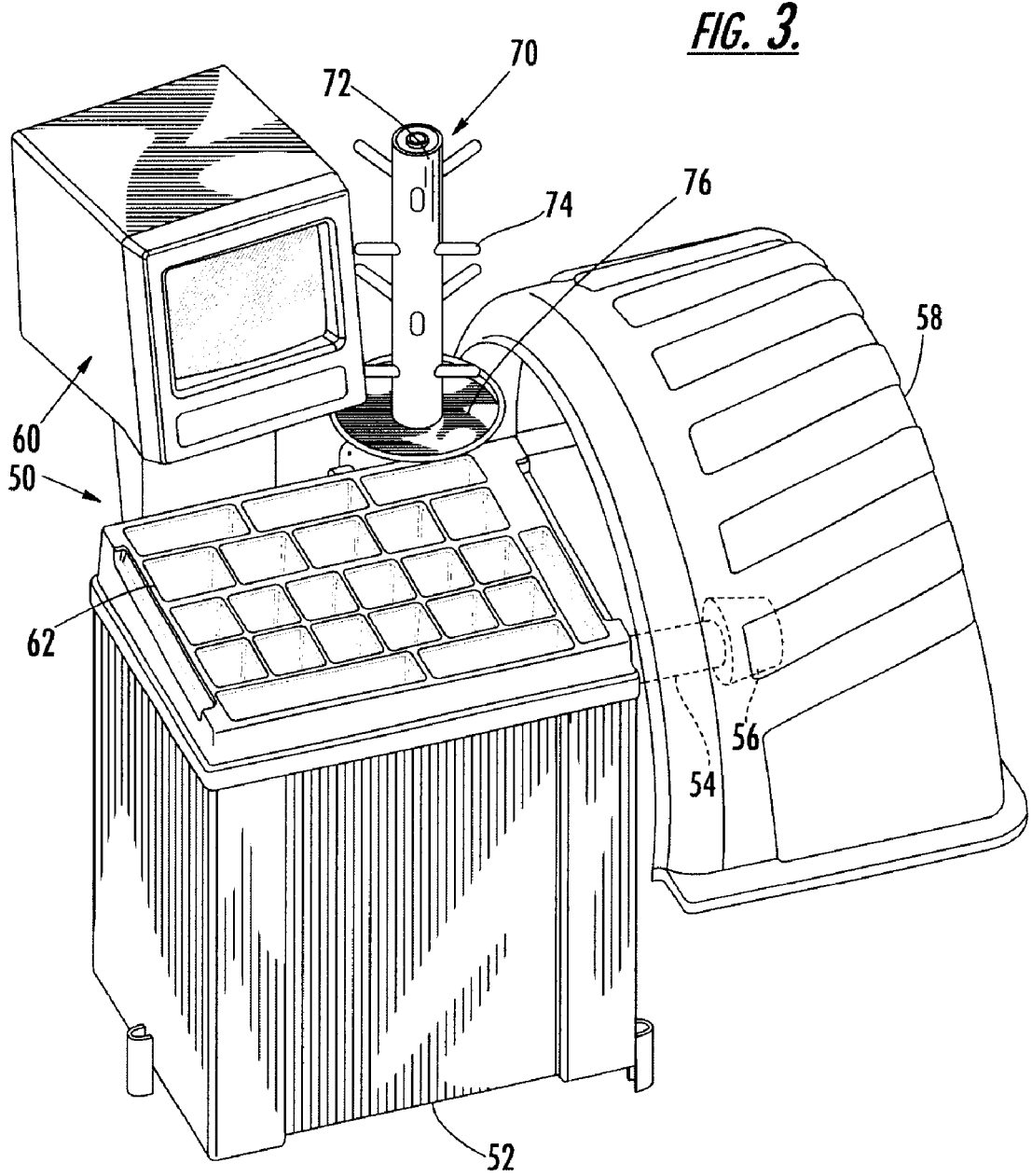
FIG. 3 is a perspective view of a wheel balancer having a novel accessory storage device according to an embodiment of the present invention.
Figure 4:
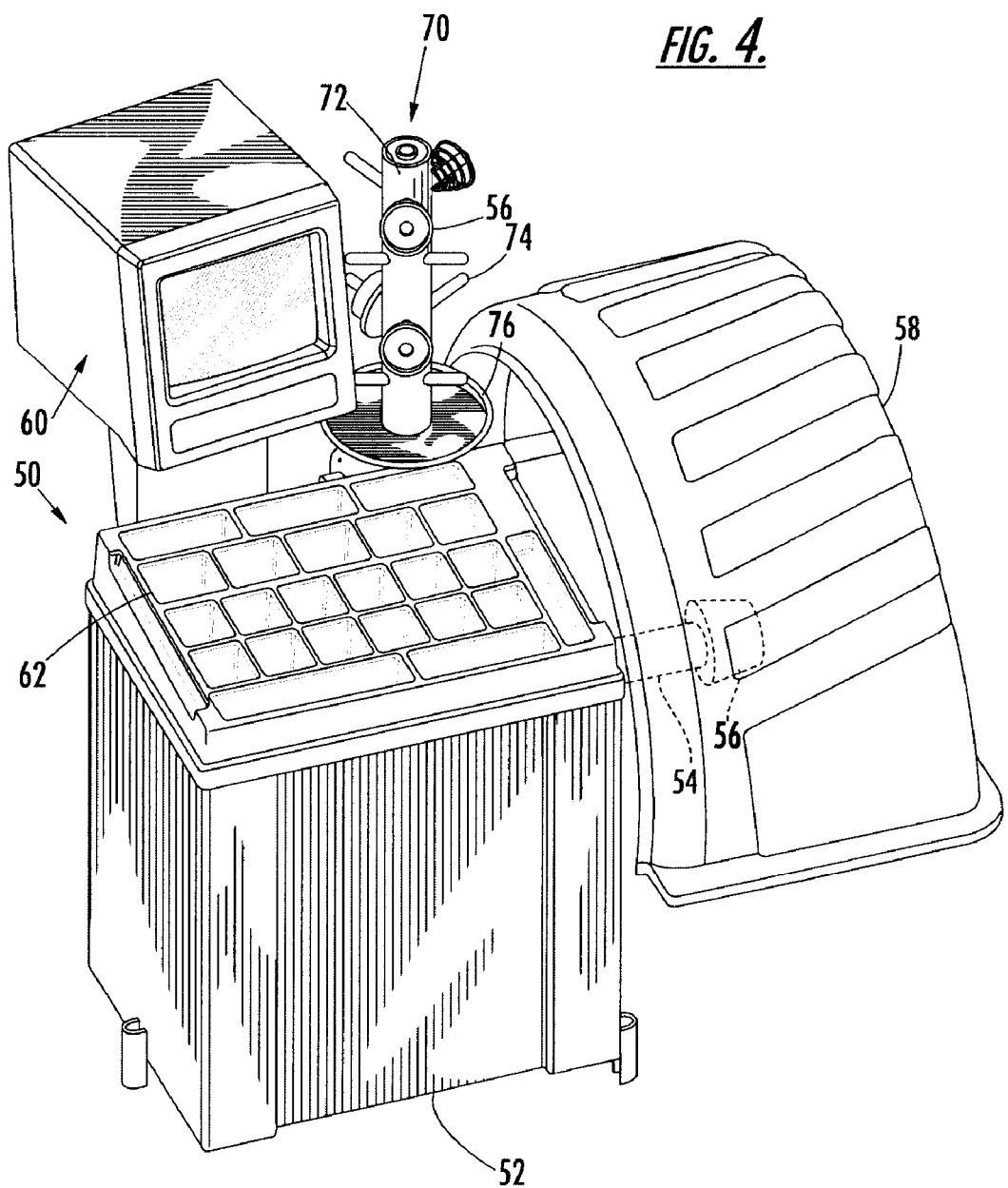
FIG. 4 is a perspective view of the improved wheel balancer of FIG. 3 with various accessories stored on the accessory storage device.

FIGS. 3 and 4 illustrate an embodiment of the present invention showing a wheel balancer 50 having a rotatable accessory storage device 70. Balancer 50 includes a chassis 52, a driven shaft 54, an adapter 56, a pivotal wheel cover 58, a control panel 60, and a storage tray 62. As illustrated, driven shaft 54 extends from chassis 52, and adapter 56 slides over driven shaft 54 for mounting a wheel. Wheel cover 58 extends over the wheel to protect the operator. Control panel 60 mounts on the top of the chassis, and storage tray 62 provides a convenient location for maintaining a supply of balancing weights or other objects.

As shown, storage device 70 mounts on chassis 52. In the illustrated embodiment, storage device 70 is proximate to driven shaft 54; however, other mounting locations on chassis 52 are within the scope of the present invention. For example, the location of other components of balancer 50, such as the control panel 60 or storage tray 62, may require storage device 70 to be mounted more distant from driven shaft 54.

Figure 5:
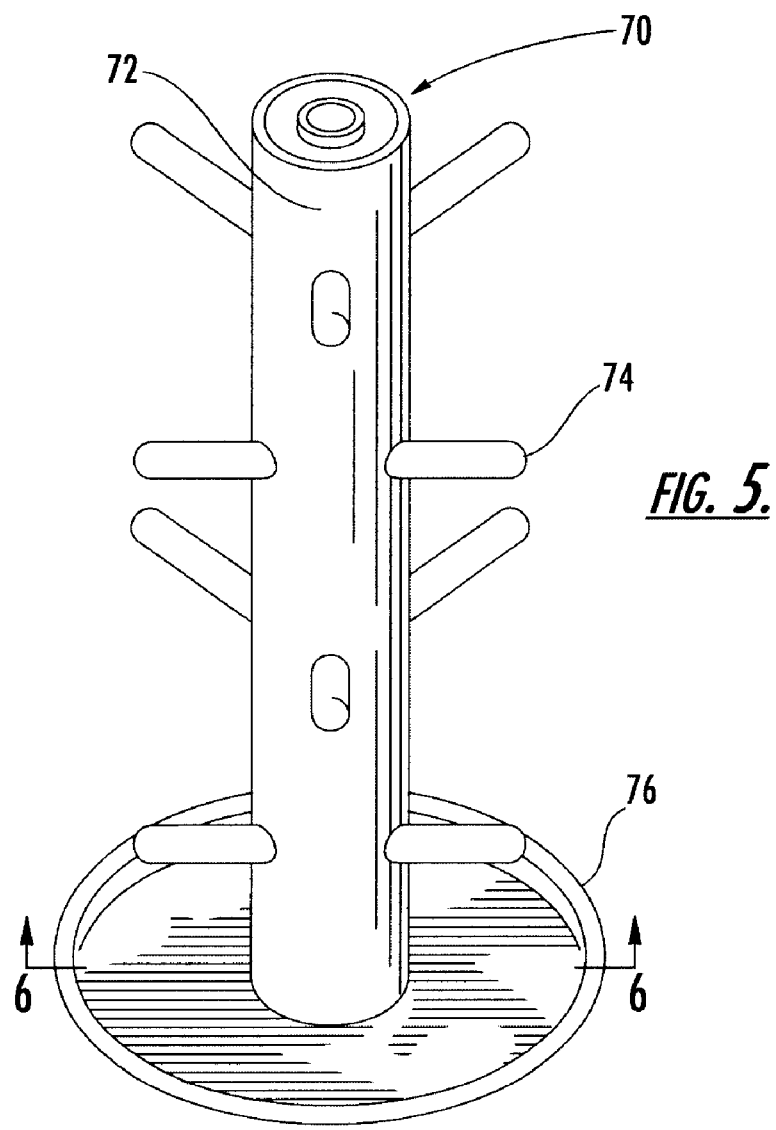
FIG. 5 is an enlarged perspective view of the accessory storage device used in the wheel balancer of FIG. 3.

Referring now also to FIG. 5, storage device 70 generally includes a post 72, multiple pegs 74 extending radially outward from the post, and a plate-like tray 76 located below the pegs. As one skilled in the art will appreciate, tray 76 is preferably fixed to post 72 so as to rotate therewith.

In this embodiment, post 72 is generally cylindrical, hollow, and made of metal, although other shapes and materials are within the scope of the present invention. For example, post 72 may have a polygonal shape, or it can be made of plastic, fiberglass, rubber, or other suitable substitute. The dimensions of post 72 can vary with the space limitation on chassis 52, but post 72 may extend approximately 1–2 feet in length in some preferred embodiments.

The multiple pegs 74 provide the means by which to hang or suspend various accessories, such as adapters 56, cones, springs, and nuts as shown in FIG. 4. In addition to extending radially outward, pegs 74 may also be inclined upward to facilitate secure storage of the accessories. Pegs 74 may be spaced about post 72 at varying distances to accommodate accessories of various sizes and shapes. The specific number of pegs 74 will generally depend on the dimensions of post 72 and anticipated storage needs. In the embodiment shown in FIG. 5, the number of pegs is at least eight.

As with post 72, pegs 74 may be generally cylindrical and made of metal, although other shapes and materials are within the scope of the present invention. For example, pegs 74 may be polygonal, curved, or spring-loaded clips to better secure the adapters 16 in place. In addition, pegs 74 may be made of plastic, fiberglass, rubber, or other suitable substitute.

The tray 76 extends radially from post 72 and provides a generally flat, horizontal surface below pegs 74. As such, the tray can be used to store wheel mounting accessories that cannot be stored on the pegs, such as accessories that lack a through bore. Tray 76 will also advantageously catch items that fall from one of the pegs, thus preventing the item from falling behind the balancing machine. As with post 72 and pegs 74, tray 76 may be made of metal, plastic, fiberglass, rubber, or other suitable substitute.

Referring now to FIG. 6, a mounting plate 78 attaches to chassis 52 by one or more bolts 80, screws, glue, or other means for attachment known in the art. Mounting plate 78 may include a pedestal 82 having an outer diameter slightly less than the inner diameter of post 72, allowing post 72 to loosely slide over pedestal 82. As a result, the weight of the post holds the post down over pedestal 82, preventing post 72 from moving laterally, while still allowing post 72 to rotate in place about pedestal 82.

Figure 7A:
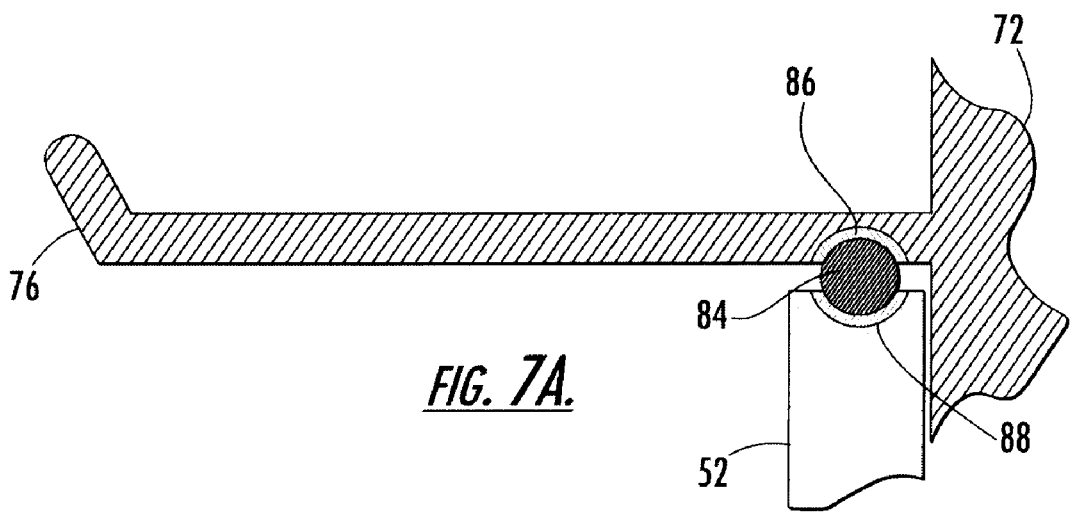

FIGS. 7A and 7B illustrate alternative mounting structures employing a bearing assembly to reduce the frictional resistance and facilitate rotation of the post. As shown in FIG. 7A, the bearing assembly may comprise a plurality of bearing balls 84 disposed between an annular groove 86 defined on the bottom of tray 76 located at the base of post 72. A second and opposed groove 88 is defined in an upper portion of chassis 52.

Equivalently, the bearing assembly may comprise an inner and outer race 90 enclosing the bearing balls 84, as illustrated in FIG. 7B. Various other types of bearing assemblies are well known in the art and included within the scope of this invention.

Figure 8:
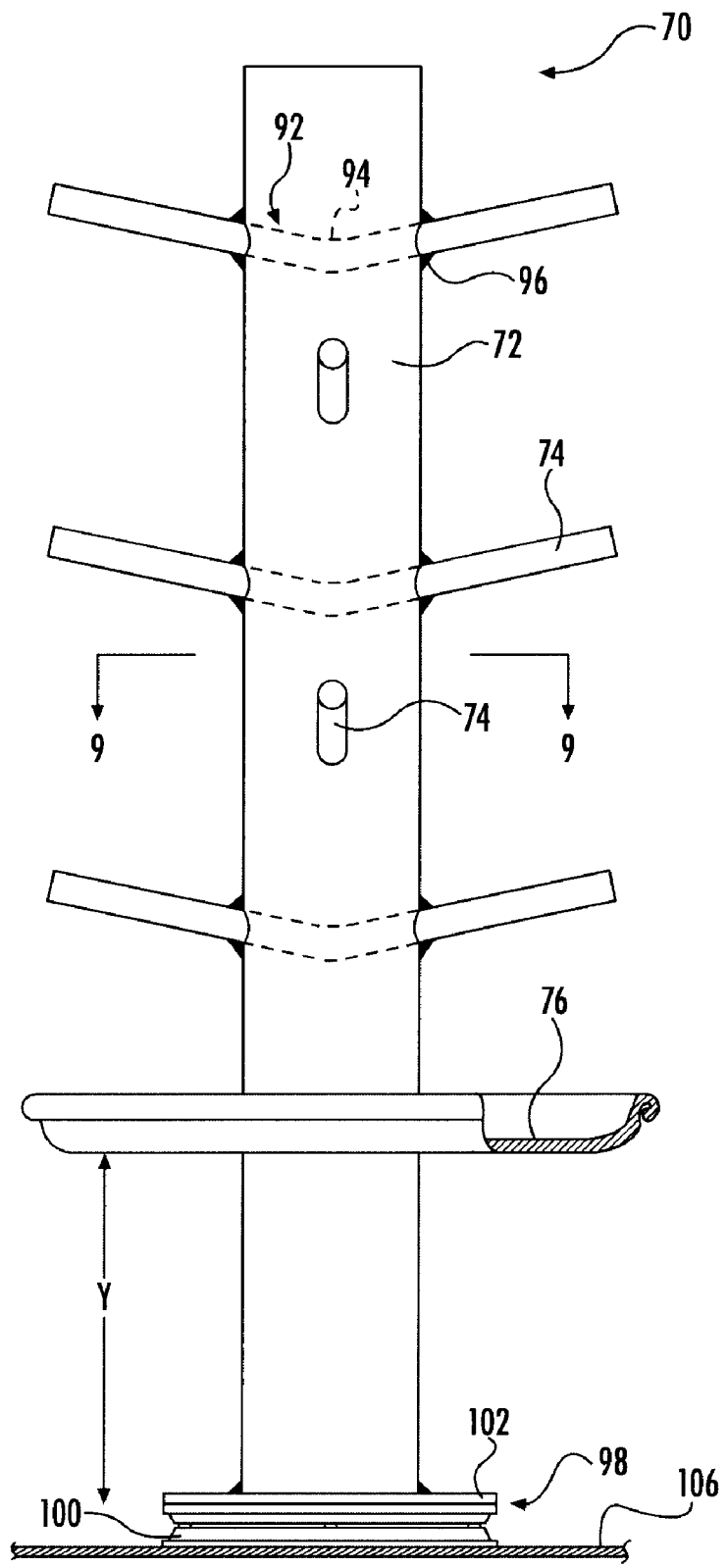
FIG. 8 is an elevational view of a still further embodiment of the accessory storage device.
Figure 9:
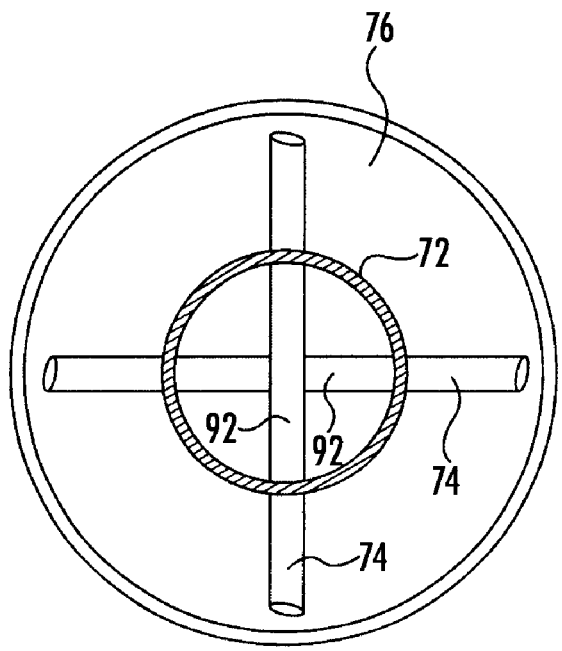
FIG. 9 is a cross-sectional view taken along line 9—9 of FIG. 8.
Figure 10:
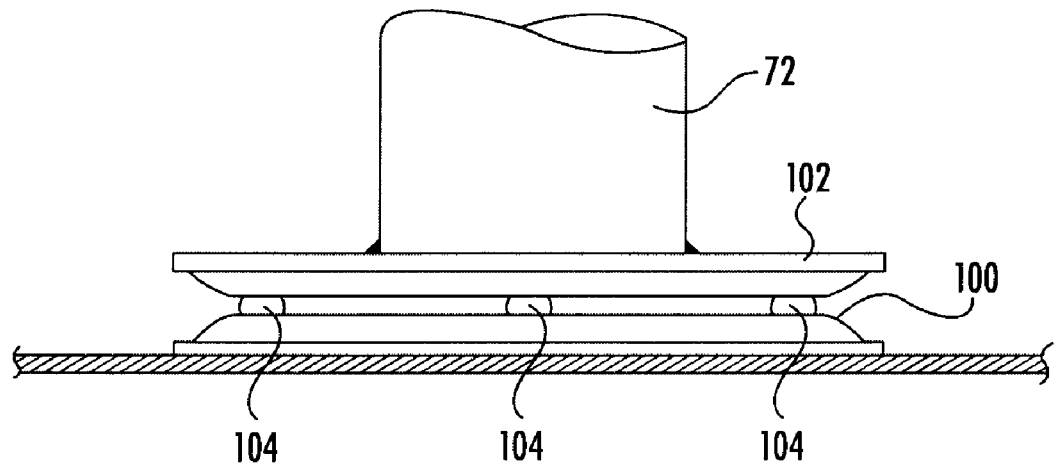
FIG. 10 is an enlarged view showing the swivel mount utilized in the embodiment of FIG. 8.

Referring now to FIGS. 8–10, an alternative embodiment of storage device 70 is illustrated. In this case, post 72 is configured as a hollow metal tube defining a series of opposed holes along its height. Diametrically opposite pegs 74 are formed as a single short rod 92 having a bend 94 at the midpoint of its length. Rod 92 is inserted through the holes in post 72 and then secured in position, such as by welding 96. Tray 76 is located on post 72 at a predetermined distance Y above the mounting location. In presently preferred embodiments, distance Y may be about six inches.

In this case, storage device 70 uses a swivel mount 98 similar to the type used for rotatable seats. Swivel mount 98 includes a fixed first portion 100 attached to chassis 52. Tube 72 is attached to a rotatable second portion 102. A plurality of bearing elements 104 are located between first portion 100 and second portion 102 to facilitate relative rotation.

In this case, accessory storage device 70 is mounted to the hood bracket 106 at which cover 58 is pivotally connected to the chassis. In this way, a structure already provided on chassis 52 for another purpose is advantageously utilized to locate and support storage device 70.

While preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal and equivalent scope of the appended claims.

What is claimed is:

1. A wheel balancer for balancing a wheel, the wheel balancer comprising:
   a chassis;
   a driven shaft extending from the chassis for rotating the wheel;
   a wheel mounting accessory operably mounted on the driven shaft for use in mounting the wheel; and
   an accessory storage device rotatably mounted on the chassis for storing the accessory when not in use.

2. The wheel balancer as in claim 1, wherein the storage device is proximate to the driven shaft.

3. The wheel balancer as in claim 1, wherein the storage device comprises a post and a plurality of pegs extending radially from the post.

4. The wheel balancer as in claim 3, wherein the pegs are straight.

5. The wheel balancer as in claim 3, wherein the number of pegs is at least eight.

6. The wheel balancer as in claim 3, wherein the storage device further comprises a tray attached to the post below said pegs.

7. The wheel balancer as in claim 6, wherein the tray is located at the base of the post.

8. The wheel balancer as in claim 1, wherein the storage device is rotatably attached to a hinge bracket for a wheel cover of said wheel balancer.

9. The wheel balancer as in claim 8, wherein the wheel balancer further comprises a bearing interposed between the mounting plate and the storage device.

10. A wheel balancer for balancing a wheel, the wheel balancer comprising:
    a chassis;
    a driven shaft extending from the chassis for rotating the wheel;
    a wheel mounting accessory operably mounted on the driven shaft for use in mounting the wheel; and
    a storage device rotatably mounted on the chassis, the storage device including a post and a retainer for holding the wheel mounting accessory when not in use.

11. The wheel balancer as in claim 10, wherein the storage device is proximate to the driven shaft.

12. The wheel balancer as in claim 10, wherein the retainer comprises a plurality of pegs extending radially from the post.

13. The wheel balancer as in claim 12, wherein the number of pegs is at least eight.

14. The wheel balancer as in claim 10, wherein the storage device further comprises a tray attached to the post below said pegs.

15. The wheel balancer as in claim 10, wherein the wheel balancer further comprises a means for rotatably attaching the storage device to the chassis.

16. The wheel balancer as in claim 15, wherein the means for rotatably attaching the storage device comprises a mounting plate and a bearing interposed between the mounting plate and the storage device.

17. A wheel balancer for balancing a wheel, the wheel balancer comprising:
    a chassis;
    a driven shaft extending from the chassis for rotating the wheel;
    a wheel mounting accessory operably mounted on the driven shaft for use in mounting the wheel; and
    a storage device rotatably mounted on the chassis, the storage device including a post and a plurality of pegs extending radially from the post for holding the wheel mounting accessory when not in use.

18. The wheel balancer as in claim 17, wherein the storage device is proximate to the driven shaft.

19. The wheel balancer as in claim 17, wherein the pegs are straight.

20. The wheel balancer as in claim 17, wherein the number of pegs is at least eight.

21. The wheel balancer as in claim 17, wherein the storage device further comprises a tray attached to the post and extending radially from the post.

22. The wheel balancer as in claim 17, wherein the wheel balancer further comprises a bearing interposed between the mounting plate and the storage device.

23. The wheel balancer as in claim 17, wherein diametrically opposite pegs are formed from a single rod segment having a bend at a midpoint thereof.

24. The wheel balancer as in claim 17, wherein said storage device includes a swivel mount for rotatably mounting said storage device to said chassis.

* * * * *